(12) United States Patent
Burkhardt et al.

(10) Patent No.: US 10,331,116 B2
(45) Date of Patent: Jun. 25, 2019

(54) METHOD, COMPUTER PROGRAM PRODUCT AND ARRANGEMENT FOR GUARDING AN AUTOMATED PROCESS TO OPERATE A HOUSEHOLD APPLIANCE BASED ON A SENSOR MEASUREMENT TO PROVIDE AN EXPECTED PROCESS PARAMETER

(71) Applicant: Electrolux Appliances Aktiebolag, Stockholm (SE)

(72) Inventors: Jennifer Burkhardt, Rothenburg o. d. Tauber (DE); Michael Herzog, Rothenburg o. d. Tauber (DE); Frank Blümel, Rothenburg o. d. Tauber (DE); Martin Knausenberger, Rothenburg o. d. Tauber (DE); Kurt Reul, Rothenburg o. d. Tauber (DE); Bianca Puchinger (Former Häuslein), Rothenburg o. d. Tauber (DE); Stefano Carrella, Rothenburg o. d. Tauber (DE)

(73) Assignee: Electrolux Appliances Aktiebolag, Stockholm (SE)

( * ) Notice: Subject to any disclaimer, the term of this patent is extended or adjusted under 35 U.S.C. 154(b) by 141 days.

(21) Appl. No.: 15/105,143

(22) PCT Filed: Feb. 19, 2015

(86) PCT No.: PCT/EP2015/053487
§ 371 (c)(1),
(2) Date: Jun. 16, 2016

(87) PCT Pub. No.: WO2015/124666
PCT Pub. Date: Aug. 27, 2015

(65) Prior Publication Data
US 2016/0349743 A1    Dec. 1, 2016

(30) Foreign Application Priority Data
Feb. 20, 2014  (EP) .................................. 14155959

(51) Int. Cl.
*A47J 37/00* (2006.01)
*G05B 23/02* (2006.01)
(Continued)

(52) U.S. Cl.
CPC .......... *G05B 23/0235* (2013.01); *A47J 27/62* (2013.01); *A47J 37/1266* (2013.01); *F24C 7/083* (2013.01);
(Continued)

(58) Field of Classification Search
CPC .. A47J 27/62; A47J 37/1266; G05D 23/1951; G05D 23/193; G05D 23/1934
(Continued)

(56) References Cited

U.S. PATENT DOCUMENTS

| 4,587,406 A | 5/1986 | Andre | |
|---|---|---|---|
| 6,953,919 B2 * | 10/2005 | Clothier | H05B 6/062 219/494 |
| 7,573,005 B2 * | 8/2009 | Clothier | H05B 3/746 219/412 |

FOREIGN PATENT DOCUMENTS

| DE | 31 46 566 A1 | 6/1983 |
|---|---|---|
| DE | 34 05 731 C1 | 5/1985 |
| DE | 10 2008 014268 A1 | 9/2009 |

OTHER PUBLICATIONS

International Search Report from Corresponding Application No. PCT/EP2015/053487; dated May 29, 2015.

* cited by examiner

*Primary Examiner* — Reginald Alexander
(74) *Attorney, Agent, or Firm* — Pearne & Gordon LLP (57) ABSTRACT

A method to safeguard an automated process in a household appliance, such as an assisted cooking process which has failure detection routines and failure handling routines. A number of failures and errors are discussed and a response to a detected failure is based on a control parameter such as an input power to the cooking process in order to trigger the
(Continued)

magnitude of the response. A corresponding computer program product and kitchen hob with a sensor are provided as well.

16 Claims, 11 Drawing Sheets (51) Int. Cl.
*A47J 37/12* (2006.01)
*A47J 27/62* (2006.01)
*G05D 23/19* (2006.01)
*H05B 1/02* (2006.01)
*F24C 7/08* (2006.01)
*G05B 11/01* (2006.01)
*G05B 19/042* (2006.01)
*H04L 12/28* (2006.01)

(52) U.S. Cl.
CPC ............ *G05B 11/01* (2013.01); *G05B 19/042* (2013.01); *G05B 23/0254* (2013.01); *G05D 23/1934* (2013.01); *H04L 12/2816* (2013.01); *H05B 1/0266* (2013.01); *G05B 2219/2642* (2013.01)

(58) Field of Classification Search
USPC ......... 99/325, 326, 327, 328, 331, 332, 333, 99/337; 426/523, 520
See application file for complete search history.

METHOD, COMPUTER PROGRAM PRODUCT AND ARRANGEMENT FOR GUARDING AN AUTOMATED PROCESS TO OPERATE A HOUSEHOLD APPLIANCE BASED ON A SENSOR MEASUREMENT TO PROVIDE AN EXPECTED PROCESS PARAMETER

In modern household environments, customers using household appliances are accustomed to save time in order to save as much of their spare leisure time for recreational or hobby purposes. The industry has taken care of this desire by providing automated ovens, driers, washing machines and the like. Such devices follow a pre-programmed process in order to perform their respective tasks. The more complicated the household appliances become, the more they depend on sensor information provided in order to control that they perform the automated process correctly. Due to a malfunction of a sensor or of the associated control device or an operational error of an operating person damage can be caused, hazardous to objects that are subject of the automated process or dangerous in situations where the use of is high energy, e.g. for heating, is a basis of the automated process. Under these circumstances, there is a substantive requirement to safeguard the proper functioning of an automated process or, in case this is not possible, to stop the process immediately.

In the German publication DE 3146566 A1 related to a process to supervise the proper functioning, a functional element of a household appliance deals with the comparison of an actual sensor measurement with an expected value and the generation of a failure signal in case an inadmissible discrepancy between the values is detected.

The invention is based on the problem to improve the proper functioning of a household appliance.

This problem is solved by a method for guarding an automated process to operate a household appliance based on a sensor measurement, by a computer program product, and an arrangement.

Advantageous embodiments of the invention are given in the dependent claims.

Advantageously, the method according to the present invention, in addition to sensor information for a response to a failure, takes a control parameter into account. This allows it to better adapt a failure response to a present state of the automated process.

Beneficially, according to a further development of an embodiment of the method according to the present invention, the process is stopped in case no process parameter is measured. Thus, the method according to this further development can properly respond to a non-connected or a misplaced sensor.

Beneficially, according to a further development of an embodiment of the method according to the present invention, if a measured process parameter cannot be determined, it is extrapolated from a previous measurement, and a weighted failure is determined based on a magnitude of a control parameter. In this manner, an adapted response to a corresponding failure is facilitated.

Favorably, a corresponding action is performed in case the process parameter cannot be measured properly. In this manner as well, the evaluating side of the measurement chain as the determination side of the measurement chain are taken into account in the failure response.

Beneficially, according to a further development of the method according to the present invention, the failure evaluation is based on an interdependency in a manner that a control parameter leads to an expected range of a process parameter. In this manner, a response to a measured process parameter can accurately be evaluated by facilitating the decision-making in basing it on a range of process parameter.

Favorably, in case the process parameter is out of range, a weighted failure is determined based on the control parameter and a difference between the expected process parameter and a measured process parameter. In this manner, an adequate response can be provided.

Beneficially, according to a further development of a method according to the present invention, zones with defined control parameters are provided and a zone and an associated process parameter are verified. In this manner, beneficially an error performed by an operator, such as a misplacement of the sensor in the wrong zone, can be accommodated and properly processed.

Advantageously, according to a further development of the method according to the present invention, in case plural failures have occurred, after a first threshold has been transgressed, a first message is generated, and after a second threshold transgression has occurred, the process is stopped. In this manner, corrective measures by an operator can be initiated, and in case they do not happen, the automated process beneficially stops and thus hazardous failures are reliably avoided.

Beneficially, according to a further development of a method according to the present invention, the household appliance is realized in a kitchen hob, such as an induction hob, as in this case high energies are applied which may cause corresponding hazardous failures.

Favorably, according to a further development of the method according to the present invention, a temperature is measured as a process parameter, and a power input is associated as a control parameter to the temperature. In this manner, beneficially a majority of automated processes in a kitchen environment can be efficiently and securely guarded by the method of the present invention.

Advantageously, a computer program product according to the present invention comprises instructions to perform the method steps of the present invention in form of process steps when they are executed by a processor. In this manner, the method according to the present invention can be implemented on the basis of a general purpose microprocessor in a household appliance. Favorably, such processors are already used to implement the automated process.

Advantageously, according to an arrangement of the present invention, only a minimum number of components are required that allows implementing a method of the present invention in the form of hardware in a technically most efficient way.

Further, advantageously, according to a further development of the arrangement according to the present invention, a line connection is established between the sensor and the control unit of the kitchen hob. Thus, a technically easy-to-implement configuration is provided that at the same time is reliable and can be implemented with a minimum number of parts.

Subsequently, examples of the invention will be further explained on a basis of embodiments shown in drawings, wherein.

Figure 1A:
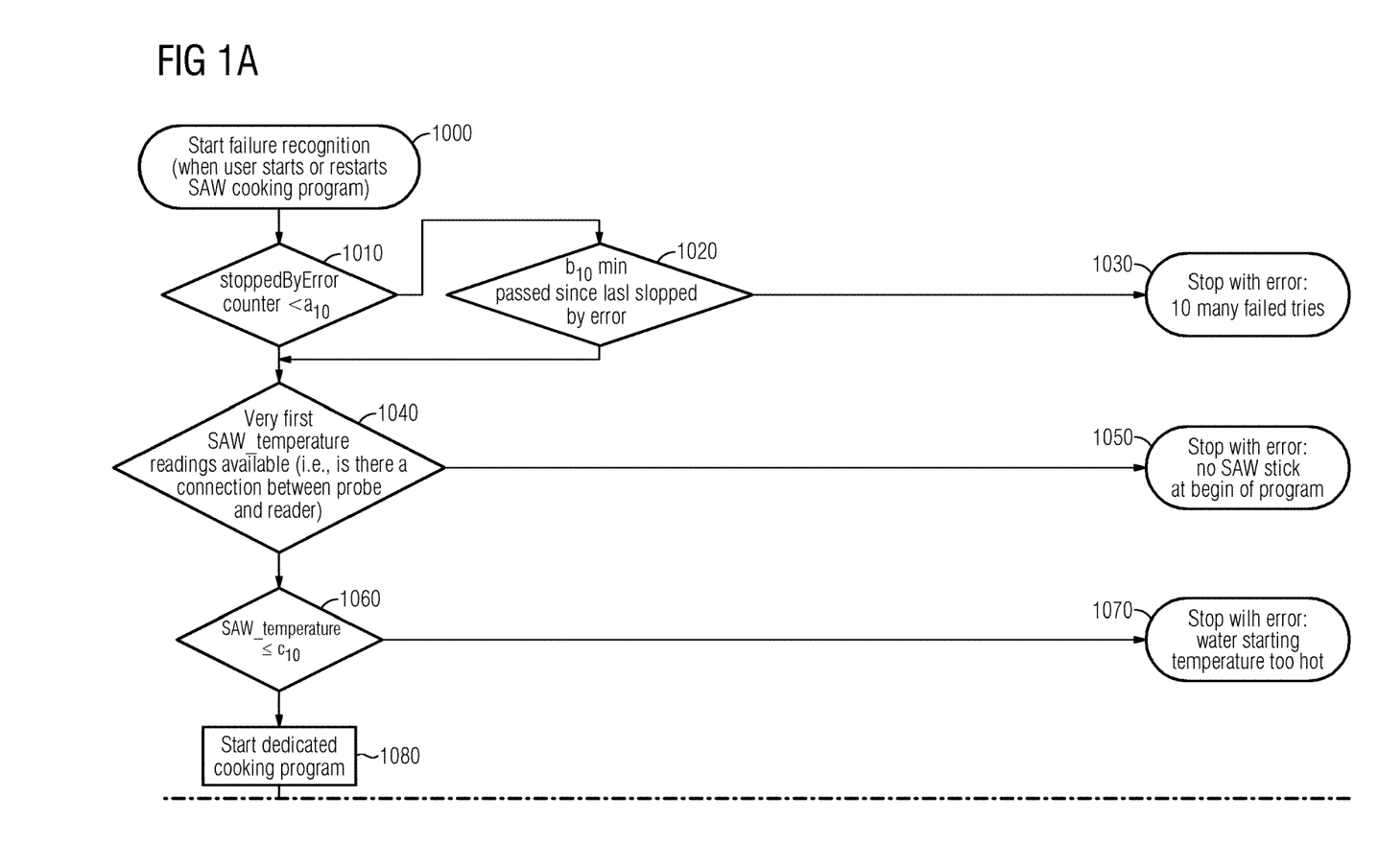
FIGS. 1A and 1B show an overall process flow.
Figure 1B:
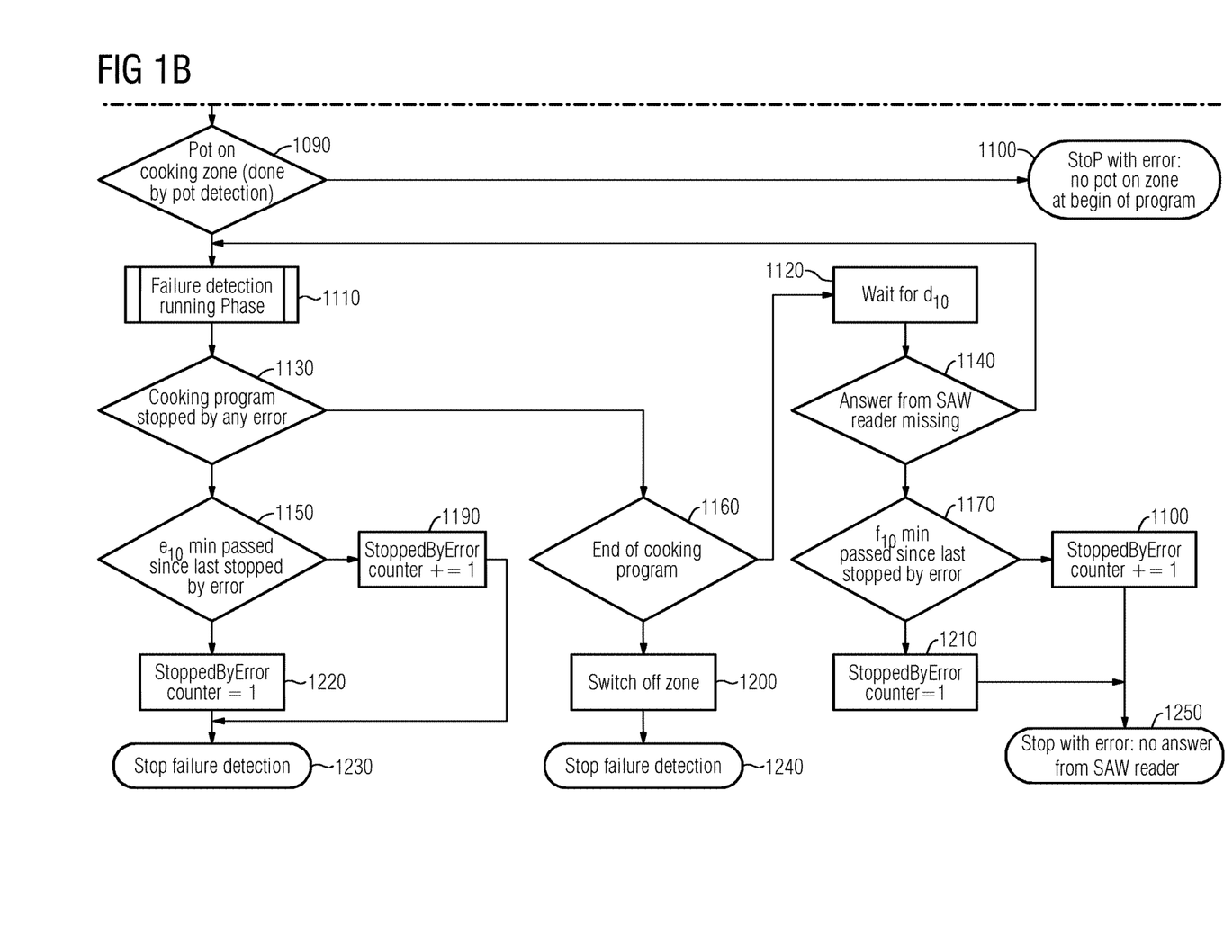

As FIGS. 1A and 1B show, an example of an overall process flow is presented. In particular, in the detection of possible failures either based on malfunctions or operator errors, preferably a failure routine is required in order to detect failure, to switch on failure detection and to resort to particular failure handling routines.

In 1000, the user starts a sensor-operated process e.g. by pressing a button or generating some sort of detectable signal actively or by his presence detected by an e.g. infrared sensor. At 1010, this process is stopped, if an error counter is smaller than $a_{10}$ beneficially a one digit number starting from two. At 1020 it is verified how much time has passed since the last stop by error. In the affirmative case if $b_{10}$ usually a single digit minute value is exceeded, the process is stopped by 1030 due to too many failed tries. At 1040, it is determined if temperature readings are available from the sensor. If this is not the case, the process is stopped at 1050 due to the assumption that there is no sensor present. In case there are proper sensor readings available, it is determined at 1060, if the temperature is smaller than $c_{10}$ beneficially a two digit number in the middle of the cooking temperature range around 40 to 60° C. If not, the automated process is preferably stopped at 1070, as the starting temperature is judged to be too hot to e.g. run some of the automated functions. At 1080, an automated e.g. cooking program is started. At 1090, it is detected if there is a cooking pot on a cooking zone. If this is not the case, at 1100 the process is stopped by error due to no pot presence. Since now in case a pot is detected to be present a cooking phase has started, a failure detection running phase is commenced at 1110. At 1130, it is determined if a cooking program has been stopped by an error. If this is the case, it is detected at 1150 if $e_{10}$ beneficially a is single digit number of minutes have passed since it has last been stopped by an error. If this is not the case, a stopped-by-error counter is increased by 1 at 1190. If it is the case, the stopped-by-error counter is set to 1 at 1220. At 1230, the program is stopped due to failure detection. At 1160, it is determined if a cooking program has ended. If this is the case, the cooking zone is switched off at 1200. After that, the failure detection is stopped at 1240. At 1120, it is waited for e.g. $d_{10}$ seconds a duration in the range of the duration of the measurement cycle plus some buffer time. At 1140, it is determined if there is an answer from a reader from the sensor-automated process. If this is not the case, a failure detection running phase is entered again at 1110. If it is the case, it is determined if $f_{10}$ a suitable single digit number of minutes e.g. between 3 to 7 have passed since the last error stop due to an error has occurred at 1170, if not, a stop-by-error counter is increased by 1 at 1180. If affirmative, the stop-by-error counter is set to 1 at 1210. The failure detection running phase is then stopped at 1250.

Figure 2A:
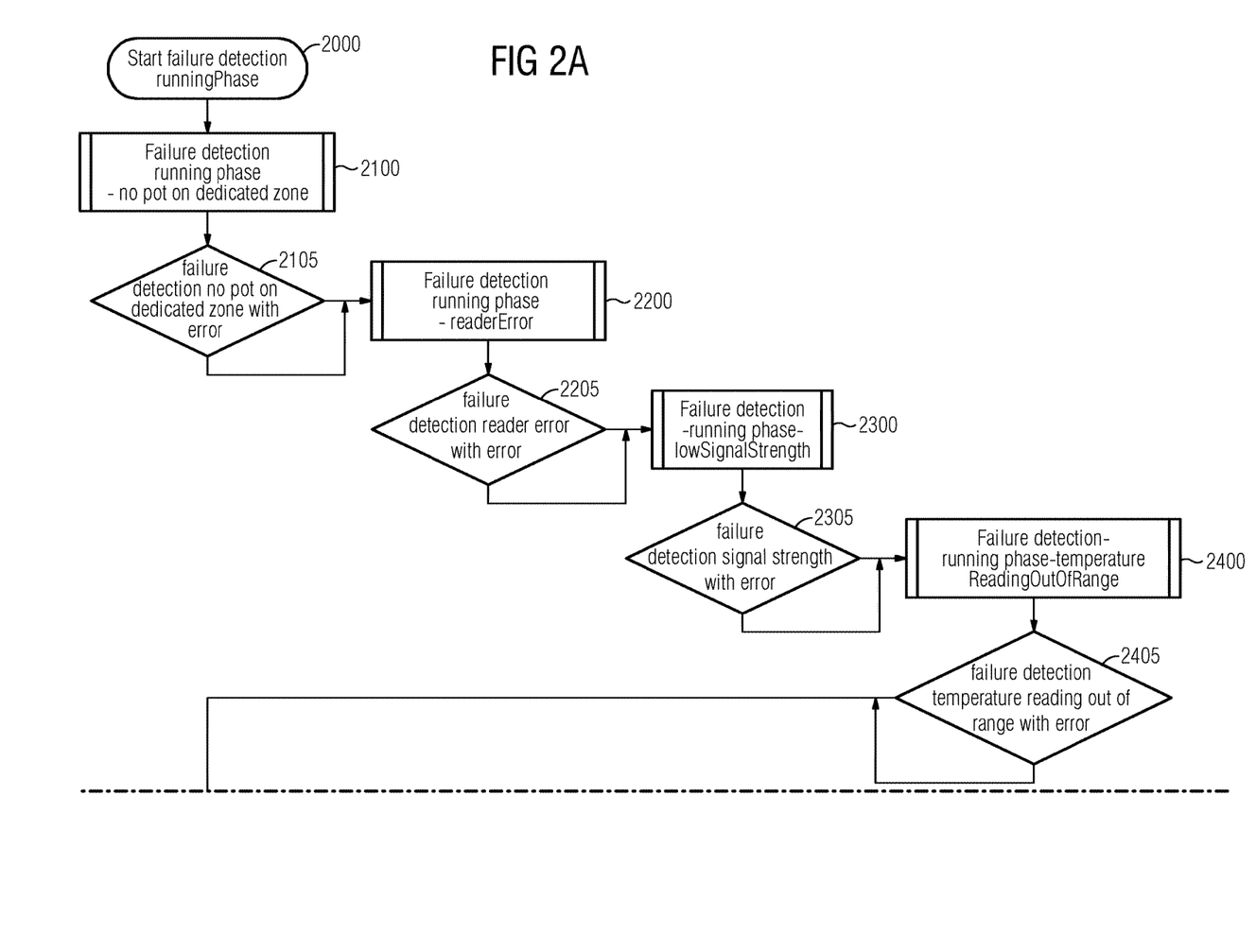
FIGS. 2A and 2B show an overall process flow for failure determination.
Figure 2B:
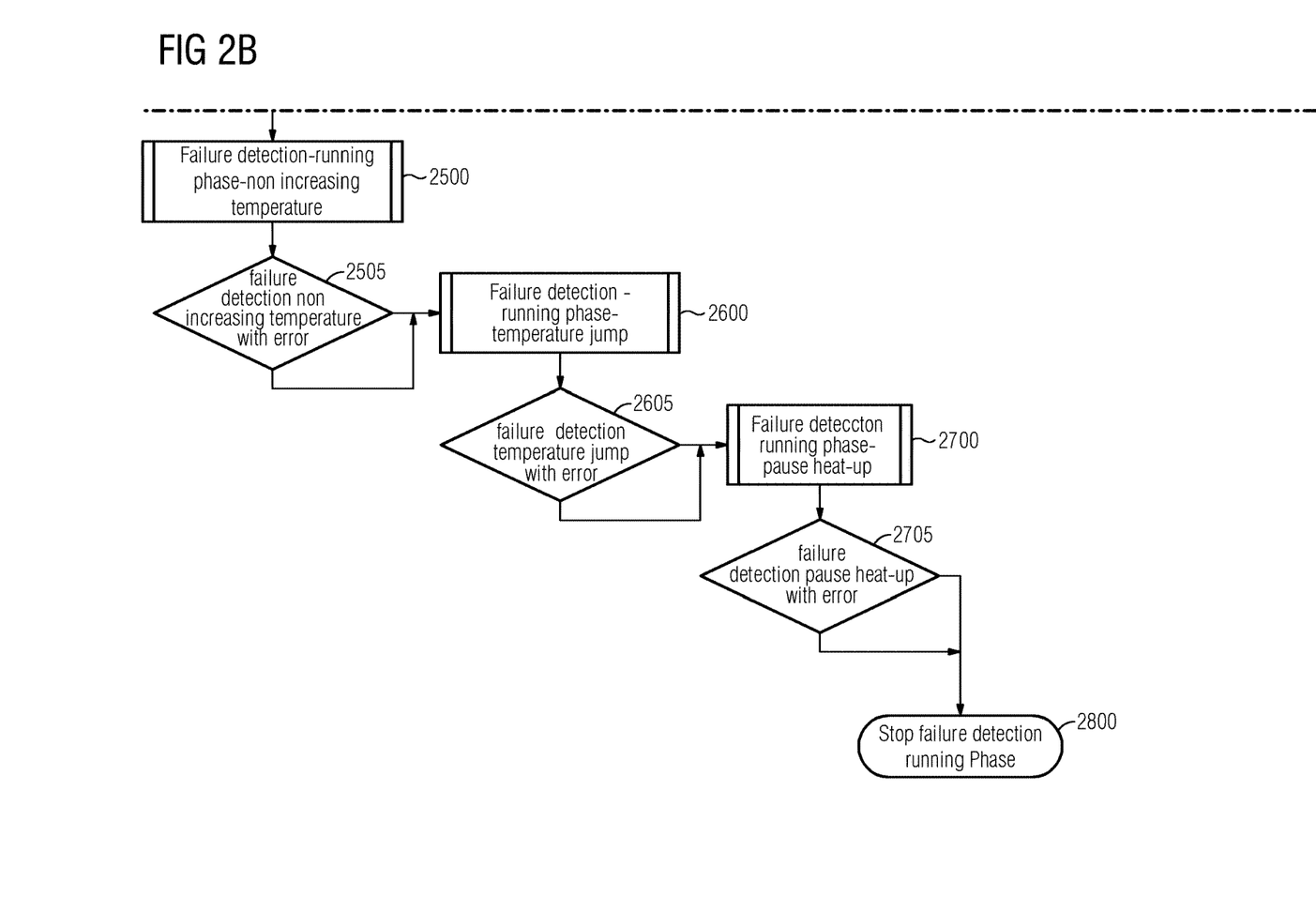

FIGS. 2A and 2B give examples of a failure detection running process 2000. At 2100, a subroutine is commenced that determines if there is a pot on a dedicated cooking zone. At 2105, failure detection is performed if no pot is present, and subsequently, irrespective of the result, a next failure detection subroutine related to a read error in evaluating the sensor data at 2200 is commenced. Irrespective of the presence of a read error or not, which is determined at 2205, a next failure detection subroutine related to a low signal strength is commenced at 2300. In this routine, it is determined if there is enough signal strength present at a signal received from a sensor at 2305. Irrespective of the result of the determination, e.g. a next failure detection subroutine is commenced in order to determine if a measured temperature is within a predefined range. At 2405, range detection is performed, and independent from the result of this determination, preferably another failure detection subroutine is then started at 2500 to determine if the temperature is increasing. A decision is made at 2505 if this is the case, and irrespective of the decision, preferably another failure detection subroutine to determine a temperature jump is commenced at 2600. A determination is performed at 2605, if a temperature jump is present, and irrespective of the result of the outcome of this determination, another failure detection subroutine preferably related to a pause in the heating is commenced at 2700. A determination is performed at 2705 if there is a break in the heating, and irrespective of the outcome of this determination, the failure detection is stopped at 2800.

Generally, the selection of a waiting time is preferably selected in order to compensate for a measurement cycle and the readout of a buffer which may preferably add up to 2 seconds plus 0.5 seconds. A measurement cycle maybe understood as a concatenation of the various failure detection routines from strep 2000 to 2800.

Subsequently, examples of individual subroutines are further explained.

Figure 3:
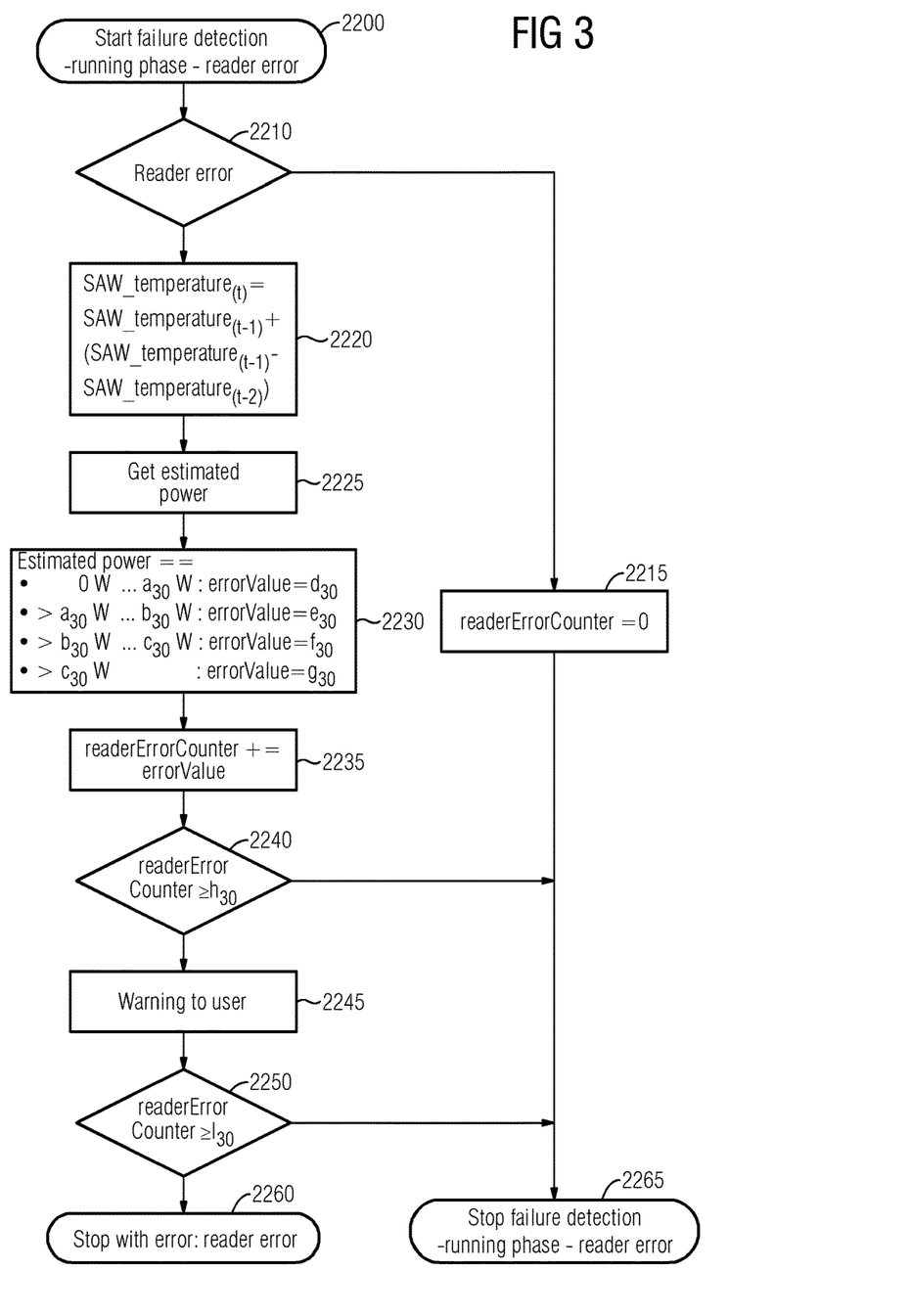
FIG. 3 shows a failure handling in case of a read error.

As FIG. 3 shows at 2200, a failure detection regarding a reader error of e.g. a temperature reader is commenced. At 2210 it is determined if a reader error is present. If not, at 2215 a reader error counter is set to zero, and at 2265, the reader error detection is stopped. Else, at 2220, different temperature values are collected as process parameter and processed, e.g. a temperature value at a point time t is estimated by performing a calculation basing it on a temperature value measured at a time t-1 plus a difference of the temperature values between times t-1 and t-2. At 2225, a power value as a control parameter is estimated e.g. a power setting can be read. At 2230, for a determining a weighted failure error, a determination is performed preferably in which range the estimated power is. In case it is between zero and $a_{30}$ watts a value in the lower hundreds between 100 and 400, preferably an error value of $d_{30}$ is allocated. If it is between $a_{30}$ watts and $b_{30}$ watts preferably a value in the upper hundreds and single digit thousands between 800 to 1400, an error value of $e_{30}$ is also preferably allocated. In case an estimated power is between $b_{30}$ watts and $c_{30}$ watts preferably a value in the single digit thousands between 1400 to 2600, an error value of $f_{30}$ is allocated. If the estimated power is greater than $c_{30}$ watts, the error value is preferably allocated to $g_{30}$. The values may preferably be in the single digit range and some of them may even be the same as well. At 2235, an accumulated error is determined by adding the error value to the reader counter error. At 2240, it is determined if the reader error counter has a value of greater than $h_{30}$ favorably a lower single digit number in relation to the total sum of the allocated error values between e.g. 2 and 6. If this is not the case, the failure detection is stopped at 2265. If it is the case, a warning is issued to an operator at 2245 e.g. by generating a message or an audible or viewable signal. At 2250, a reader error counter evaluation is performed. If it is greater than $i_{30}$ e.g. a suitable value between 8 and 14, the process stops at 2260. If it is smaller than $i_{30}$, the failure detection is stopped at 2265.

Beneficially, if there is no answer, e.g. from a measurement subsystem in case it is expected, a failure of the system is detected. A corresponding handling of this failure is a switch off W of the automated process and a switch-off of a power to a dedicated e.g. cooking zone. In case e.g. an internal failure is present at a reader of sensor data, preferably in case if a current measured temperature is not present it is replaced with an extrapolated temperature value, e.g. a weighting of this failure is depending on an estimated power.

Beneficially, the higher the power is, the higher the weighting factor should be that is associated to the failure.

Beneficially, the weighting factor is the sum of the failures multiplied with each weighting factor. In case there is a first allocated limit that is exceeded by the weighted failures, beneficially a warning message or an error code may be generated in order to be read-out by an operator. Usually, the operator is a person that cooks food and is present in front of the kitchen hob. If there is a second defined higher failure limit provided which is transgressed, the power will beneficially be switched off in order to stop the automated process. After that, beneficially the counter of weighted values is reset to zero, once there exists a measurement cycle without any failure.

Figure 4:
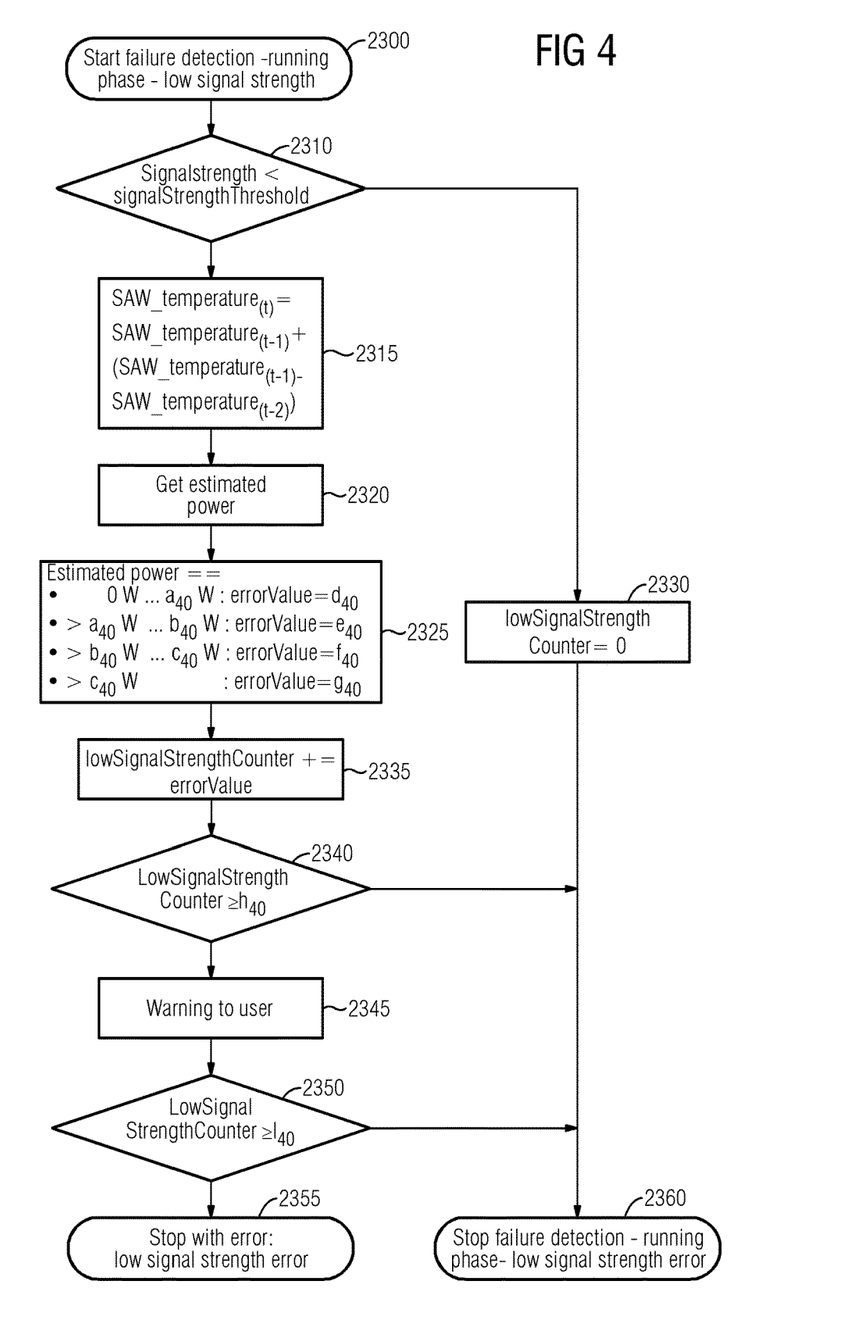
FIG. 4 shows a failure determination in terms of signal strength.

FIG. 4 shows an example of another subroutine. In this case this is dealing with the presence of enough signal strength in a signal received from a sensor performing measurements of a process parameter of the automated process. It is started at 2300. Next, at 2310, a determination is performed if the signal strength is high enough, e.g. if it is above or below a threshold. If it is not below a threshold, a low signal strength counter is set to zero at 2330, and the subroutine is stopped at 2360. In case the signal strength is below this threshold at 2310, temperature estimation is performed in a similar manner as was explained in step 2220 a current value is determined by an estimation based on previous measurements. After that, at 2230, an estimated power is gathered. In this case, this can be done by determining a switch state of a kitchen hob or by measuring an actual power. In an analogous manner as it was explained in FIG. 3, an error value is associated to a respective estimated power at 2325.

In case it is between zero and $a_{40}$ watts a value in the lower hundreds between 100 and 400, preferably an error value of $d_{40}$ is allocated. If it is between $a_{40}$ watts and $b_{40}$ watts preferably a value in the upper hundreds and single digit thousands between 800 to 1400, an error value of $e_{40}$ is also preferably allocated. In case an estimated power is between $b_{40}$ watts and $c_{40}$ watts preferably a value in the single digit thousands between 1400 to 2600, an error value of $f_{40}$ is allocated. If the estimated power is greater than $c_{40}$ watts, the error value is preferably allocated to $g_{40}$. The values may preferably be in the single digit range and some of them may even be the same as well.

In this case it has been provided that four error values can be associated, whereas between 0 and 1200 watts, the error values are the same. It can be, however, beneficial to provide more or less error values and to perform other discriminations and allocations than the ones given in this example here. At 2335, the determined error value is set for the low signal strength counter. At 2340, it is determined if the low signal strength counter is of a value larger than $h_{40}$ favorably a lower single digit number between e.g. 2 and 6. If this is not the case, the failure detection subroutine is stopped at 2360. If it is the case, at 2345 a warning is generated and preferably displayed for an operator or given as an acoustic signal. At 2350, it is determined if the low signal strength counter has a value of larger than $i_{40}$ e.g. a suitable value between 8 and 14. If this is not the case, the failure detection is stopped at 2360. On the other hand, if it is the case, the process is stopped at 2355 due to a low signal strength error e.g. because the signal is too weak and thus measured process parameters are unreliable. Preferably, in the case of subroutines 2200 and 2300, a counter should not be reset and a value should be kept until a next time the subroutine is performed. In case of a reader error, the reader returns an error instead of a temperature value.

Figure 5:
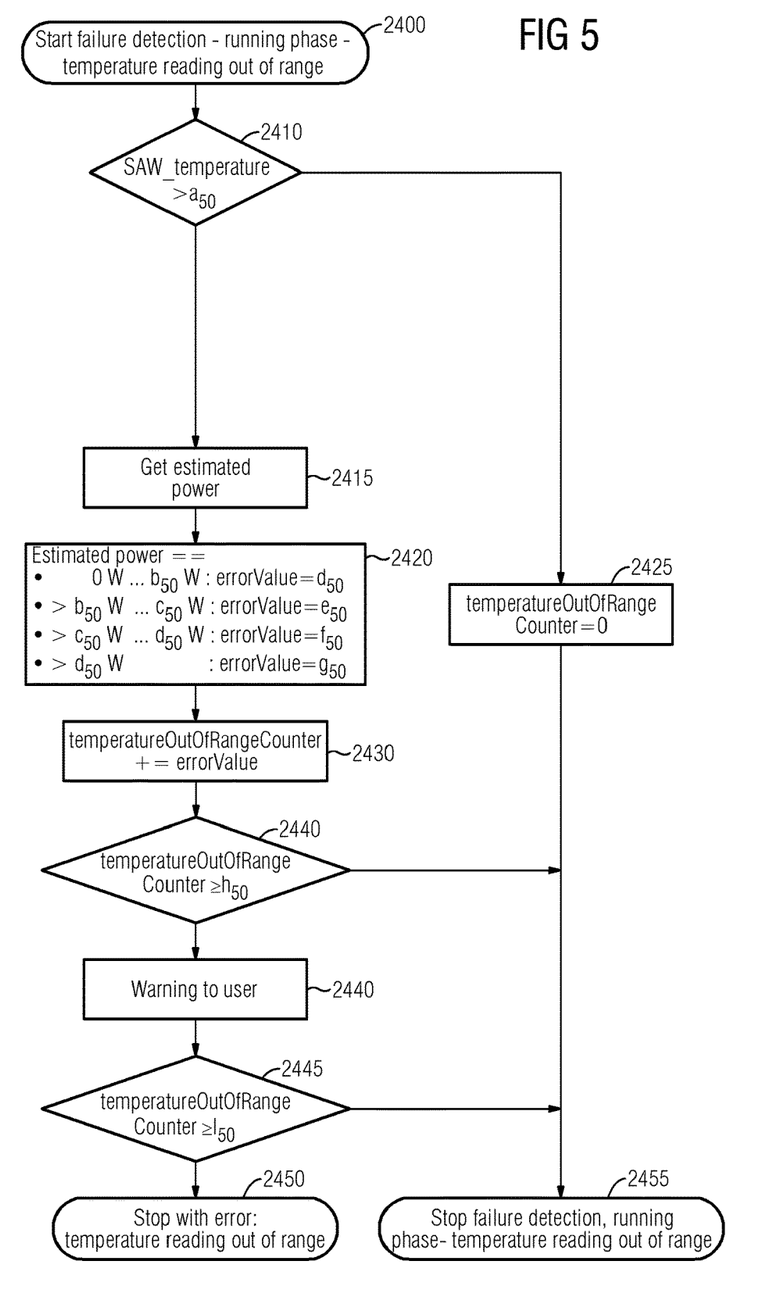
FIG. 5 shows a failure determination in terms of temperature range.

FIG. 5 shows another example of a failure detection subroutine to detect if a temperature reading is not in an expected range. This is started at 2400. Here it is determined if a temperature reading provided from the sensor is larger than $a_{50}$, a temperature above a usual boiling point of water for instance e.g. in the range between 105 and 115° C. If this is not the case, the temperature out of the range counter is beneficially set to zero at 2425, and the failure detection subroutine related to this failure is stopped at 2455. On the other hand, if a larger temperature reading is present, an estimated power is gathered at 2405 and in a similar manner at 2420 as explained in subroutines 2200 and 2300 at steps 2230 and 2325, an error value is allocated to a respective estimated power.

In case it is between zero and $b_{50}$ watts a value in the lower hundreds between 100 and 400, preferably an error value of $d_{50}$ is allocated. If it is between $b_{50}$ watts and $c_{50}$ watts preferably a value in the upper hundreds and single digit thousands between 800 to 1400, an error value of $e_{50}$ is also preferably allocated.

In case an estimated power is between $c_{50}$ watts and $d_{50}$ watts preferably a value in the single digit thousands between 1400 to 2600, an error value of $f_{50}$ is allocated. If the estimated power is greater than $d_{50}$ watts, the error value is preferably allocated to $g_{50}$. The error values may preferably be in the single digit range and some of them may even be the same as well for different power ranges.

However, in this case, four discrete error values may beneficially be allocated ranging from 0 to 3 or 5 or 7 or 9. For small powers between 0 to 300 watts, the error value here e.g. is set to 0. The other error values correspond to the ones that are allocated in the above-listed process steps 2230 and 2325. They may be attributed to respective power ranges in a linear manner referring to the total value range or in some distribution manner according to a function such as logarithmic or exponential function. It is conceivable that a low heating power will not affect a temperature change very much, once a temperature is measured very high, and thus the error value being allocated to 0 in such a case is reasonable.

In a next step, a temperature out-of-range counter is set to the determined error value at 2430. At 2435, it is checked if the temperature out-of-range counter has a value of larger than $h_{50}$ favorably a lower single digit number between e.g. 2 and 6. If this is not the case, the temperature failure out-of-range detection is stopped at 2455. On the other hand, if it is the case, in a first step at 2440, a warning is generated and presented to the operator in the form of a reading on a display or an acoustical message or a light indication or another form of short-range or long-range communication.

In the next step, a second threshold for a temperature out-of-range counter is evaluated. Here, the threshold is set to $i_{50}$. In case the counter value is not larger than $i_{50}$ e.g. a suitable value between 8 and 14, the next step will be 2455 to stop the corresponding failure detection subroutine. On the other hand, if the value is transgressed, the automated process is stopped and an indication is given that a temperature is out of range at 2450. Such a failure subroutine is preferably detecting read-out temperature values, which are out of the expected temperature range, such as which are defined for the offered automated process respectively an assisted cooking program.

Beneficially, it is detected as a failure, if the measured temperature value is higher than the defined threshold. If a too high temperature is measured, it is an indicator for a misuse of the probe including the sensor. A weighting of such a failure is is preferably depending on an estimated power. The higher the power, the higher the weighting factor is. The weighted failure is beneficially the sum of the failures multiplied with each weighting factor. If there are two limits, one first threshold and a second one, at a first stage, a warning message may be issued, and at a second stage, the automated process is stopped, respectively the power of a cooking zone may be switched off.

Figure 6A:
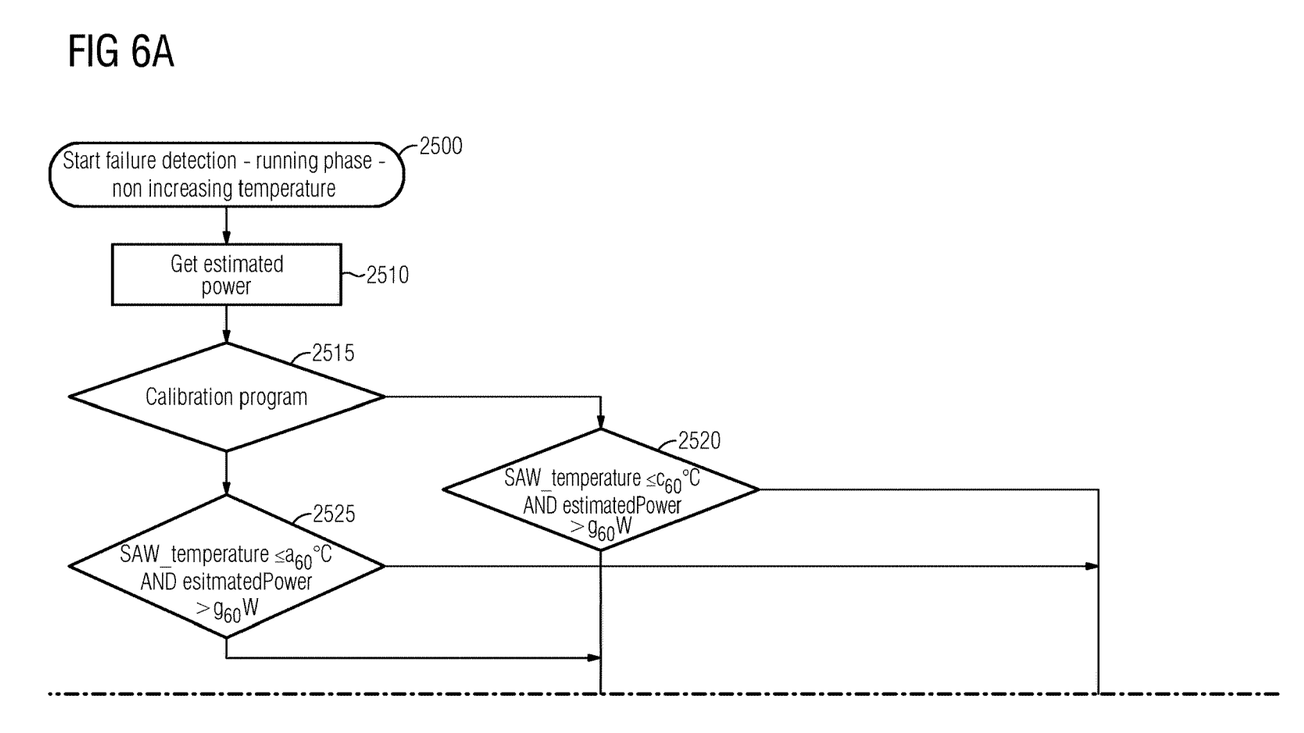
FIGS. 6A and 6B show a failure determination in terms of non-increasing temperature.
Figure 6B:
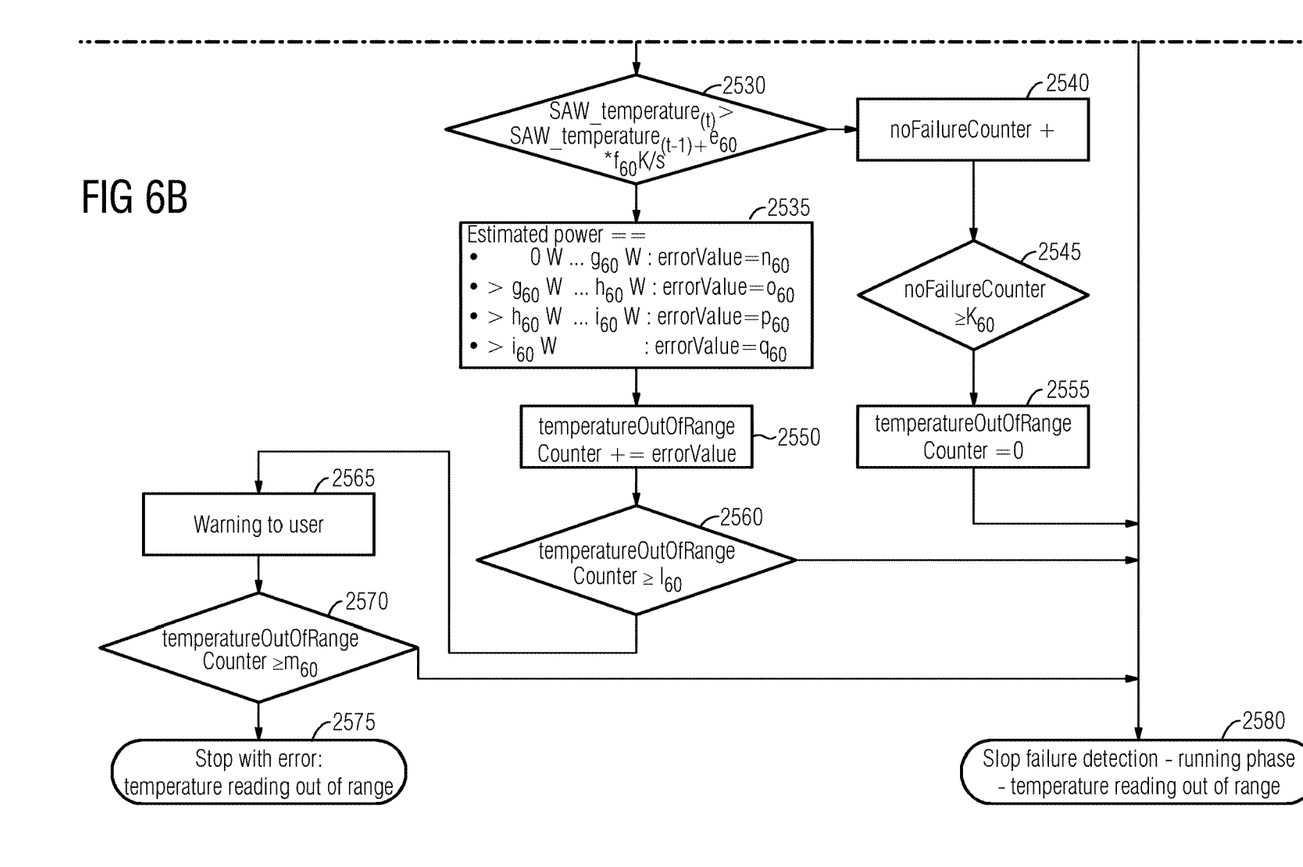

As FIGS. 6A and 6B show, another example of a failure detection subroutine is about the determination of the presence of an increasing temperature which is started at 2500. In this case, in a first step 2510, an estimated power is gathered. At 2515, a calibration program is preferably executed. In one case it is determined if a sensor temperature is below $c_{60}$° C., e.g. a value below the boiling point of water, preferably between 90 and 98° C. and an estimated power is larger than $g_{60}$, a value in the lower hundreds between 100 and 400 watts. If this is not the case, then the associated failure detection subroutine is terminated at 2580. On the other hand, if the sensor temperature reading is smaller than $a_{60}$° C., e.g. a value below $c_{60}$, preferably between 80 and 89 ° C. and an estimated power higher than $g_{60}$ watts, step 2530 is entered, which is also entered in case the determination 2520 is affirmative. Then, at 2530, a determination is performed if a temperature measured by the sensor at the point in time t is larger than a sensor temperature reading at a point in time t-1 plus $e_{60}$s e.g. a single digit second value in the range of the duration of the measurement cycle times $f_{60}$K/s e.g. a suitable value for the temperature gradient between 0.01 to 0.09 K/s or more. In case this is affirmative, a no-failure counter is increased at 2540. At 2545, it is determined if the no-failure counter is larger than $k_{60}$, favorably a lower single digit number between e.g. 2 and 6. If this is not the case, the failure determination subroutine is stopped at 2580. On the other hand, if this is the case, a temperature out-of-range counter is set to 0 at 2555. On the other hand, in a similar manner like at step 2420, an error value is associated to an estimated power in e.g. four discrete steps from ranging from 0 to 3 or 5 or 7 or 9 as explained in step 2420.

In case it is between zero and $g_{60}$ watts a value in the lower hundreds between 100 and 400, preferably an error value of $n_{60}$ is allocated. If it is between $g_{60}$ watts and $h_{60}$ watts preferably a value in the upper hundreds and single digit thousands between 800 to 1400, an error value of $o_{60}$ is also preferably allocated. In case an estimated power is between $h_{60}$ watts and $i_{60}$ watts preferably a value in the single digit thousands between 1400 to 2600, an error value of $p_{60}$ is allocated. If the estimated power is greater than $i_{60}$ watts, the error value is preferably allocated to $q_{60}$. The error values may preferably be in the single digit range and some of them may even be the same as well for different power ranges.

Once this is done, at 2550, the temperature out-of-range counter is preferably set to this error value. At 2560, a determination of a value of the temperature out-of-range counter is performed. If it is not larger than $l_{60}$ favorably a lower single digit number between e.g. 2 and 6, the failure determination subroutine is stopped at 2580. On the other hand if this is the case, meaning larger than $l_{60}$, at a first stage, a signal or warning to inform an operator is generated and presented to him. At 2565, in a second step at 2570, a second threshold of $m_{60}$ favorably a lower double digit number between e.g. 14 and 28 is evaluated for the temperature out-of-range counter. If it is not above $m_{60}$, then the failure detection subroutine is stopped at 2580. On the other hand, the automated process is stopped at 2575, if the temperature out-of-range counter is higher than $m_{60}$. As indicated above, other values may be chosen to perform discrimination in the process, and more or less subroutines may also be performed depending on the application case.

A subroutine to detect such an above failure may be useful in case of an automated process, where plural cooking zones are present when an automated assisted cooking program is performed, and in order to determine if the sensor probe is placed at the right cooking zone. If power above a certain value is applied to the cooking pot, then the temperature should increase significantly, once it is significantly below the boiling point. If this is not the case, the pot may be placed in the wrong zone.

Beneficially, the temperature should be increasing with a certain gradient. Thus, a temperature change must be present, if a heating is performed. Such a gradient may be set depending on the applied power. Other implementations not depending on the power are possible as well.

Figure 7:
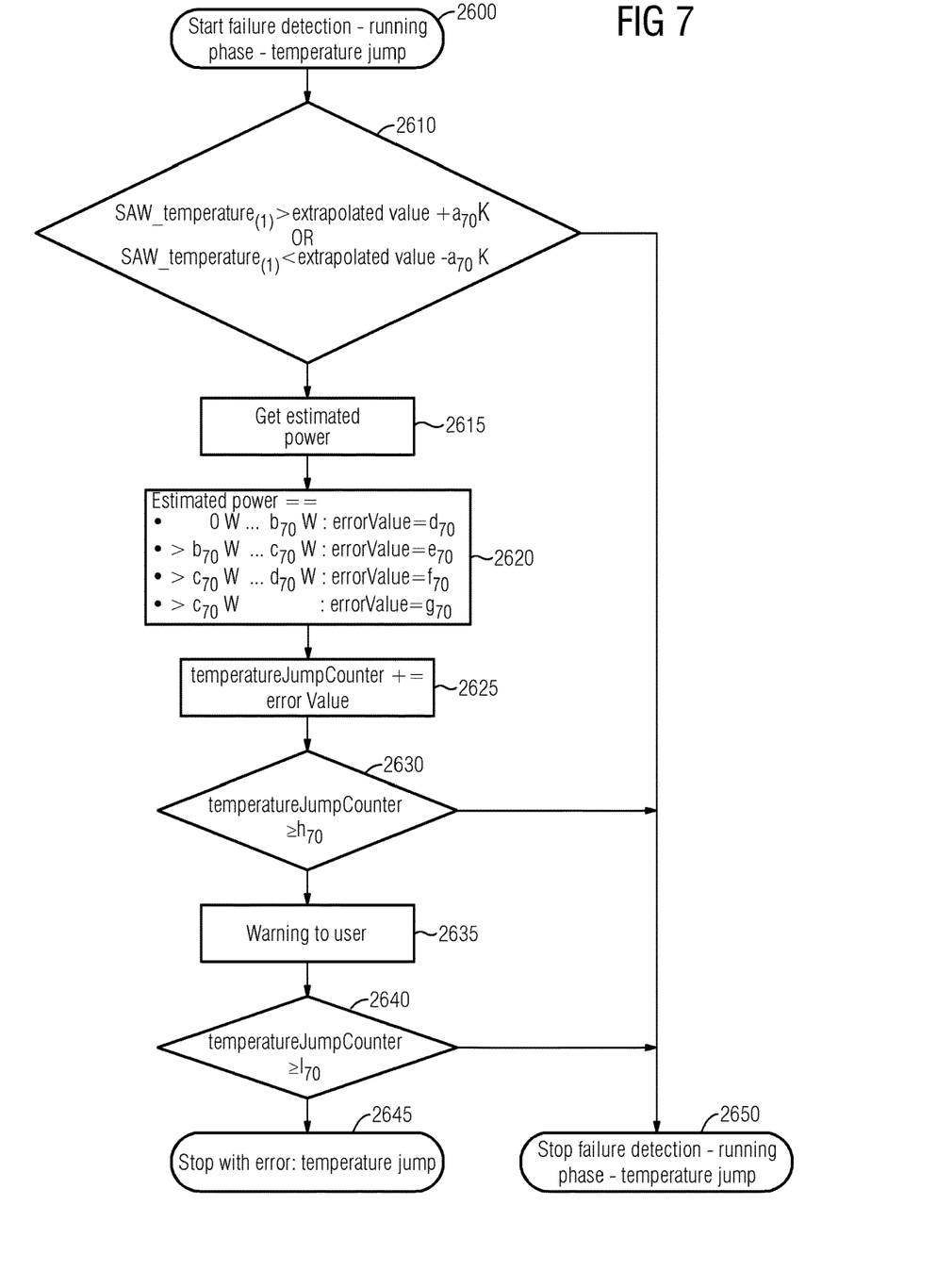
FIG. 7 shows a failure determination in terms of a temperature jump.

As FIG. 7 shows, another failure detection subroutine may be performed in order to determine a jump in the temperature. This is started at 2600. At 2610, it is determined if a temperature reading at a point in time t is larger than an extrapolated value plus $a_{70}$K or smaller than an extrapolated value—$a_{70}$K, meaning a range determination is performed for the temperature at this point in time to be within a +/−$a_{70}$ Kelvin range from the extrapolated value. $a_{70}$ favorably being a higher single digit value between e.g. 4 and 9. If this is not the case, the corresponding failure detection subroutine is stopped, as apparently there is no jump present in the measured temperature. On the other hand, at 2615, an estimated power is gathered like in steps 2415 and 2510 that were explained above. At 2620, error values are allocated to certain power ranges ranging from 0 to 3 or 5 or 7 or 9. This means that e.g. here four discrete power ranges may be defined and associated to four discrete power values analogue to the other above-mentioned steps e.g. 2420 and 2535.

In case it is between zero and $b_{70}$ watts a value in the lower hundreds between 100 and 400, preferably an error value of $d_{70}$ is allocated. If it is between $b_{70}$ watts and $c_{70}$ watts preferably a value in the upper hundreds and single digit thousands between 800 to 1400, an error value of $e_{70}$ is also preferably allocated.

In case an estimated power is between $c_{70}$ watts and $d_{70}$ watts preferably a value in the single digit thousands between 1400 to 2600, an error value of $f_{70}$ is allocated. If the estimated power is greater than $d_{70}$ watts, the error value is preferably allocated to $g_{70}$. The error values may preferably be in the single digit range and some of them may even be the same as well for different power ranges.

At 2625, a temperature jump counter error value is set to the determined error value. At 2630 it is determined if the corresponding counter value is larger than $h_{70}$ favorably a lower single digit number between e.g. 2 and 6. If this is not the case, the failure detection subroutine is stopped at 2650. In an affirmative case, a warning is generated at 2635 and presented to an operator. In a further step, it is determined if the temperature jump counter has a value of larger than $i_{70}$ favorably a lower double digit number between e.g. 10 and 18. If this is not the case, again the failure detection subroutine is stopped at 2650. On the other hand, if the value is higher than at 2645, the automated process is stopped with an error regarding a temperature jump, e.g. indicating a cooking zone can be switched off and a corresponding cooking program can be stopped as well, while at the same time an indication may be given at a display unit that something is wrong with the program and the user should interact. This can also be done by a flashing light or by an audible message. Beneficially, during an automated process, e.g. a running cooking program, the counter of weighted failures for temperature jumps will never be reset and always accumulate the corresponding values.

With such a failure detection subroutine, it can be e.g. determined if an operator removes the sensor from one pot and puts it into another pot. There may be other failure detection subroutines regarding a corresponding power profile. With such a failure detection subroutine, it can be detected and determined if the temperature sensor is in a pot allocated to a zone for which an assisted cooking mode in form of an automated process is performed. In particular, an exchange of a pot with water which is intended to be heated up, which is replaced by a pan filled with oil, can lead to a severe hazard. In such a case, to detect corresponding failures, a correlation between an applied power and a temperature change beneficially can be used. If power is applied, the temperature increases, and if no power is applied, the temperature remains mainly unchanged, except e.g. by the behavior caused by the time constants of the system. In such a case, firstly power is applied for a certain period of time, and then no power is applied and the temperature values are checked if they correlate to the power profile. In order to avoid overheating of a wrongly placed object, the maximum amount of energy for the first part of this evaluation may be limited. In order to acquire more measurement values by using a fixed measurement rate, a first phase can be prolonged by limiting/reducing the amount of power and using the same amount of energy. This prolongation beneficially reduces the influence of the time constants of the system.

In order to find out the temperature change per time when heating up, the difference between the current temperature and the old temperature value is calculated e.g. every measurement cycle until the defined level of energy is reached. With the largest difference determined, the slope for the extrapolated value is fixed for the following evaluation. After a defined level of energy is reached, the power is switched off, until the measured temperature value is lower than the extrapolated temperature, which may be determined in form of a calculated temperature with fixed slope +5 K. For more accurate sensors, a smaller change may be sufficient. Such a condition may e.g. need to become true within a defined time, otherwise it is determined that the temperature probe/sensor is not placed in the chosen cooking zone and the automated process is stopped. In case this condition becomes true within the defined time limit, the cooking zone is switched on again with the maximum power value. Such a failure is e.g. only repeated if the pot detection detects no pot.

Figure 8:
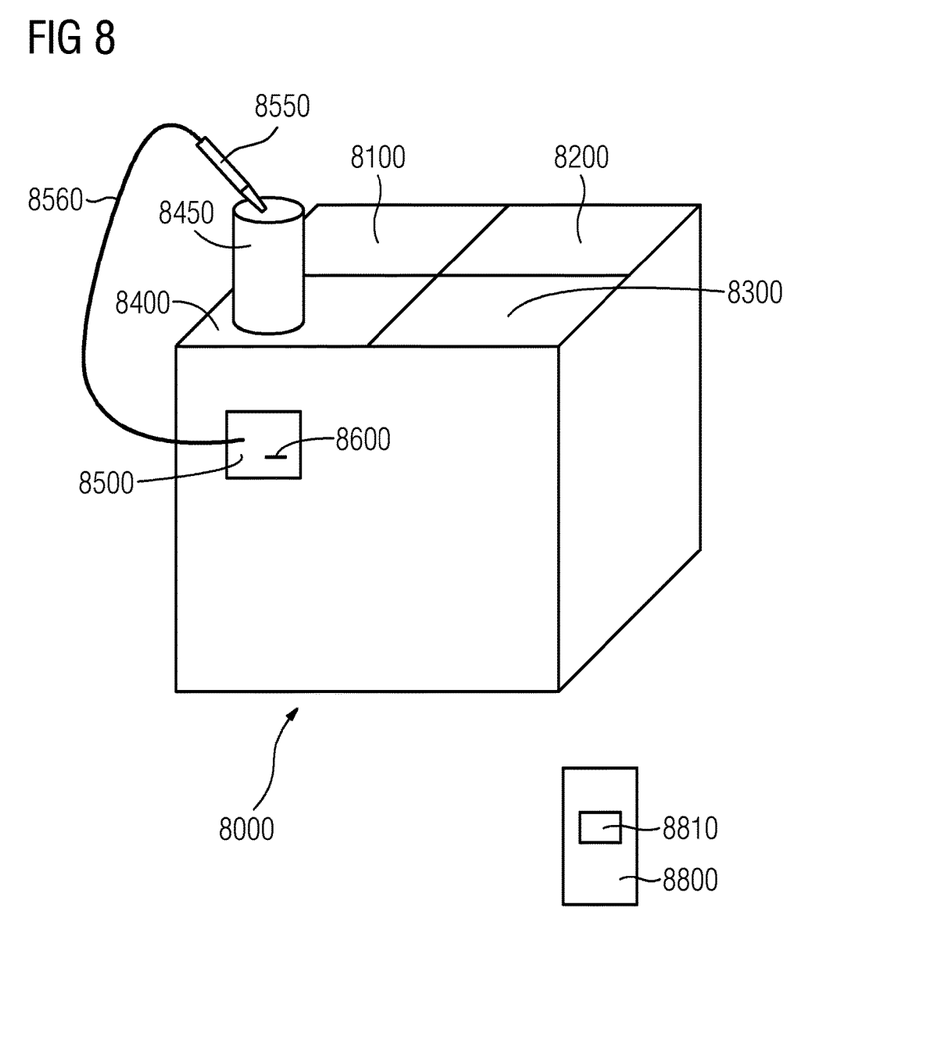
FIG. 8 shows an example of an arrangement according to an embodiment of the present invention.

FIG. 8 shows an example of an arrangement according to an embodiment of the present invention. Here, a cooking hob 8000 is shown which comprises several cooking zones 8100, 8200, 8300 and 8400. On one cooking zone, a pot 8450 is placed. This pot may be subject to heating in an automated process which needs to be guarded according to a method of the present invention. In this case, also a controller 8500 is present which is controlling the measurements of a sensor probe 8550 which is placed inside of the cooking pot to measure the temperature of a substance that is to be heated there. The controller 8500 may as well perform the automated process as the method of the present invention. For instance, it may comprise a memory and a memory reader 8600, where a corresponding program to effect an automated process stored on a data carrier can be inserted and read. The program can be stored on the memory card or another suitable device or may be transferred wirelessly into a memory of the controller 8500. Then, it will be read out by a computing unit of the controller and performed in a sequence of steps as indicated in the method steps of FIG. 1 to FIG. 7, for instance.

Also storage medium 8810 is depicted that contains computer instructions 8810 in form of program code or the like. That when is executed by a computing unit of the hob 8000 such as the controller 8500 make it execute the guarding of the automated process.

Above, embodiments and examples of the invention have been given. There may be other values used, and there may be a subselection of steps performed. The sensor may be connected by wire 8560 or wirelessly to the controller 8500. A range of household appliances may be subject to automated processes. Here, a kitchen hob in a kitchen environment has been discussed. There may be, however, other applications as washing machines, driers or microwave ovens where the present invention may beneficially be applied.

LIST OF REFERENCE NUMERALS

1000, 1010, 1020,
1030, 1040, 1050,
1060, 1070, 1080,
1090, 1100, 1110,
1120, 1130, 1140,
1150, 1160, 1170,
1180, 1190, 1200,
1210, 1220, 1230,
1240, 1250 Steps of an overall process flow
2000, 2800 Failure detection running process start stop
2100, 2105 Pot Detection
2200, 2205 Reader Error Detection
2300, 2305 Signal Strength Error Detection
2400, 2405 Temperature Range Error Detection
2500, 2505 Rising Temperature Error Detection
2600, 2605 Jumping Temperature Error Detection
2700, 2705 Pause Heat Up Error Detection
2210, 2215, 2220
2225, 2230, 2235
2240, 2245, 2250
2260, 2265 Steps of a Subroutine for Reader Error Detection
2310, 2320, 2325,
2330, 2335, 2340,
2345, 2350, 2355,
2360 Steps of a Subroutine for Signal Strength Error Detection
2410, 2415, 2420,
2425, 2430, 2435,
2450, 2455 Steps of a Subroutine for Temperature Range Error Detection
2515, 2580, 2530,
2520, 2540, 2545
2580, 2555, 2430,
2550, 2560, 2580,
2565, 2570, 2580,

2510, 2575, 2580 Steps of a Subroutine for Rising Temperature Error Detection
2610, 2615, 2535
2620, 2625, 2630,
2650, 2635, 2645,
2650 Steps of a Subroutine Jumping Temperature Error Detection
8000 Cooking Hob
8100, 8200,
8300, 8400 Cooking Zone
8450 Pot
8500 Controller
8550 Sensor Probe
8600 Memory Reader
8560 Cable, Wire
8800 Storage Medium
8810 Instructions

The invention claimed is:

1. Arrangement for guarding an automated process to operate a household appliance based on a sensor measurement to provide an expected process parameter comprising a cooking hob, a controller, a cooking zone, a cooking vessel and a sensor, wherein:
the cooking zone is adapted to be heated under the control of the controller with a feedback given by the sensor; and
the sensor is adapted to measure a process parameter;
the controller is configured to change the process parameter by operating on a control parameter;
the controller is configured to acquire a first failure in response to determining that a change in the control parameter does not lead towards an expected process parameter; and
the controller is further configured to acquire an accumulated value of errors corresponding to a first failure, set a first threshold for the accumulated value, and generate a signal upon transgression of the said first threshold for the accumulated value.

2. Arrangement according to claim 1, wherein the sensor is coupled to the controller by a wired connection.

3. Arrangement according to claim 2, wherein the cooking hob comprises a reader for a storage medium.

4. A method for guarding an automated process to operate a household appliance based on a sensor measurement by a sensor to provide an expected process parameter, wherein the method comprises:
measuring the process parameter by the sensor,
changing the process parameter, by operating on a control parameter of the household appliance, by a controller of the household appliance,
acquiring, by the controller, a first failure in response to determining that a change in the control parameter does not lead towards an expected process parameter;
acquiring, by the controller, an accumulated value of errors corresponding to the first failure, setting a first threshold for the accumulated value, and generating a signal upon transgression of the said first threshold for the accumulated value, and
determining, by the controller, a response to the first failure based on the control parameter.

5. The method according to claim 4, wherein, in response to determining that no process parameter is measured, stopping the automated process.

6. The method according to claim 4, wherein the automated process and the control parameter are associated to an expected range of the process parameter, and in case the measured process parameter is not within that range, detecting a failure.

7. The method according to claim 6, wherein a weighted failure is detected.

8. The method according to claim 6, wherein a failure value associated with the failure depends on a difference between an expected process parameter and the measured process parameter.

9. The method according to claim 4, wherein the household appliance comprises several zones, wherein distinct automated processes can be performed at each of the said zones and wherein, the method further comprising verifying the correspondence of the said zones and the said automated processes.

10. The method according to claim 4, wherein the household appliance is a cooking hob.

11. The method according to claim 4, wherein the process parameter is a temperature measured by the sensor.

12. The method according to claim 4, wherein the control parameter is a power controlled by a controller of the household appliance.

13. Computer program product comprising a non-transient storage medium storing instructions that when read and executed by a controller execute the method steps according to claim 1 as process steps for guarding the automated process.

14. The method according to claim 4, wherein the control parameter is an input power to the household appliance.

15. A method for guarding an automated process to operate a household appliance based on a sensor measurement, by a sensor, to provide an expected process parameter, wherein the method comprises:
measuring the process parameter, by the sensor;
changing the process parameter, by operating on a control parameter of the household appliance, by a controller of the household appliance;
acquiring, by the controller, a failure in response to determining that a change in the control parameter does not lead towards an expected process parameter;
in response to determining that the process parameter cannot be determined, extrapolating the process parameter from a previous measurement, and determining a weighted failure based on the magnitude of the control parameter by the controller; and
determining, by the controller, a response to the failure based on the control parameter.

16. The method according to claim 15, wherein the process parameter cannot be properly measured.

* * * * *

UNITED STATES PATENT AND TRADEMARK OFFICE
CERTIFICATE OF CORRECTION

PATENT NO. : 10,331,116 B2
APPLICATION NO. : 15/105143
DATED : June 25, 2019
INVENTOR(S) : Burkhardt et al.

Page 1 of 1

It is certified that error appears in the above-identified patent and that said Letters Patent is hereby corrected as shown below:

In the Specification

Column 3, Line 41: please delete the word "is".

Column 5, Line 4: please delete the letter "W".

Signed and Sealed this
Tenth Day of September, 2019

Andrei Iancu
*Director of the United States Patent and Trademark Office*